United States Patent [19]

Meyering

[11] Patent Number: 4,963,120
[45] Date of Patent: Oct. 16, 1990

[54] PERSON POWERED VEHICLE AUTOMATIC TRANSMISSION

[76] Inventor: Ralph A. Meyering, 1369 Somerset, Grosse Pointe Park, Mich. 48230

[21] Appl. No.: 249,581

[22] Filed: Sep. 26, 1988

[51] Int. Cl.$^5$ ............................................. F16H 9/00
[52] U.S. Cl. ......................................... 474/69; 474/70
[58] Field of Search .................................. 474/78-82, 474/69, 70

[56] References Cited

U.S. PATENT DOCUMENTS

| | | | |
|---|---|---|---|
| 3,929,025 | 12/1975 | Perry | 474/70 |
| 4,164,153 | 8/1979 | Moritsch et al. | 474/70 |
| 4,276,037 | 6/1981 | Ryan et al. | 474/70 |

Primary Examiner—Thuy M. Bui

[57] ABSTRACT

The vehicle drive operates with pedal force rotating a cantilever beam. The beam force can be applied rapidly to the drive, increasing the drive force at one point of the beam revolution to overcome an increase in vehicle rolling resistance. The beam force can also be applied at a steady rate to the drive for the full beam revolution when the vehicle rolling resistance is not changing. The rate the beam force is applied to the drive provides the person pedaling the vehicle, bicycle riding or running exercise in one beam revolution. Reversing the pedal rotation also rotates the beam in the reverse direction for vehicular braking.

1 Claim, 1 Drawing Sheet

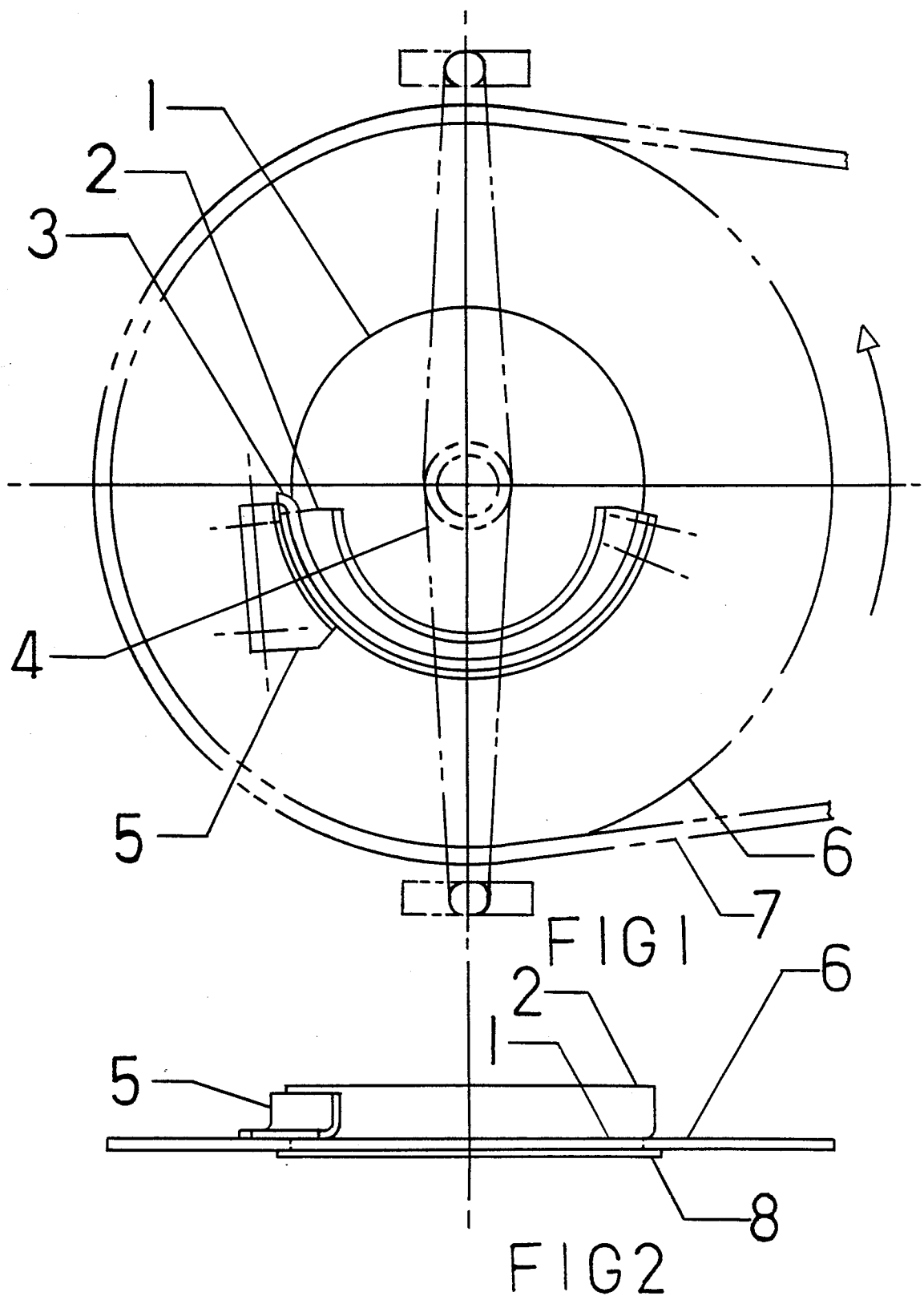

PERSON POWERED VEHICLE AUTOMATIC TRANSMISSION

BACKGROUND OF THE INVENTION

1. Field of the Invention

The invention relates generally to bicycles and to drive transmissions and the replacement of controls and many gear ratios. The invention uses the effect of sudden loads applied to bars to get increased force on a beam without the load impacting the beam.

2. Description of Prior Art

Work on shock forces to beams did show the increased force on the beam and the shape of the energy curve. The effect of two times the load on a beam due to a sudden load in contact with a beam was used. Riding a ten speed bicycle did show the lack of strength of the parts for hard use and problems when shifting the chain. The use of sudden load to a beam to drive a bicycle, uses a small number of strong and durable drive parts to give the bicycle rider the new leg exercise of bicycle riding and running.

SUMMARY OF THE INVENTION

The invention is a vehicle drive that consists of a cantilever spring, strong stampings and a two piece sprocket. When used on a bicycle, the rider has the exercise of running and bicycle riding in one revolution of the pedals. The rider also has the choice of bicycle riding exercise for one revolution of the pedals. The type of exercise for one pedal rotation is determined by how steady or sudden the spring impacts the drive mechanism leaving the spring in position to put force on the drive or to deflect the spring out of the way by a force larger then a preset force. The type of vehicular brakes used with the drive can be the clamp type that clamps on the rim of the tire or the type where you can stop pedaling and coast or reverse the direction of the pedals to apply the vehicular brakes.

BRIEF DESCRIPTION OF THE DRAWINGS

FIG. 1 is a left side view of the drive mechanism.

FIG. 2 is a bottom view of the drive mechanism shown in FIG. 1.

DESCRIPTION OF THE PREFERRED EMBODIMENT

Using the current practice on bicycles of pedals and levers 4, the invention allows the rider of a vehicle such as a bicycle to apply force suddenly on the pedals and levers 4 at one point of the pedal and lever 4 revolution to overcome the increased load to start riding, the increased load to go up a hill and the increased load to travel faster, for any condition that increases the rolling resistance. The application of force at only one point of the pedal and lever 4 revolution gives the rider running and bicycle riding exercise. When the rider is on level ground or prefers a slow start the rider can operate the vehicle with steady force all around the pedal and lever 4 revolution as current practice on bicycles. Pedaling in the opposite direction allows the rider to rotate the spring 3 backwards to apply the vehicular brakes. The invention will work with a vehicular brake that clamps on the rim of the tire or the type where you can stop pedaling and coast and reverse the pedaling direction to apply the vehicular brakes. FIG. 1 shows the retainer 2 bolted to the hub 1. The spring 3 is bolted at the right end to the retainer 2. When the spring 3 is rotated counter-clockwise by force on the pedals and levers 4 and the spring 3 puts a sudden force on the driver 5 that is larger then the present force, the spring 3 deflects toward the center of the hub 1 and pushes the driver 5 in a counter-clockwise rotation with increased force over the input force. This action replaces the current practice on ten speed bicycles of changing sprocket ratios manually. The driver 5 is bolted to the sprocket 6. The sprocket 6 transmits force and motion with the chain 7 to the wheel or wheels that move the vehicle. FIG. 2 shows how the sprocket 6 rotates on the hub 1 and is retained sideways by the retainer 2 and the guide 8 which is bolted to the hub 1. The hub 1 fastens to the pedal and levers 4 using current methods. The chain 7 fits the sprocket 6 using current methods. FIG. 1 and FIG. 2 show only one retainer 2, spring 3 and driver 5, but more of the groups of parts can be used for more impact points and lower pedal and lever 4 forces to furnish the required energy per revolution. When two retainers 2 are used the guide 8 is replaced by the second retainer 2. Rotating the spring 3 clockwise impacts the driver 5 and the spring 3 is loaded in compression. The spring 3 does not deflect out of the path of the driver when loaded in compression.

I claim:

1. A vehicle drive that imparts a sudden force from at least one spring rotating with at least one retainer and a hub to a driver, said driver rotating with a sprocket that rotates on and relative to said hub, said vehicle drive comprising a retainer bolted to said hub, said spring being bolted at one end to an end of retainer, said driver being bolted to said sprocket, said sprocket transmitting torque by means of a chain drive for propelling the vehicle, said sprocket being rotatable on the hub and being retained sideways thereon by said retainer, and a guide member bolted to said hub, whereby during part of a revolution of said hub, said spring contacts said driver with increasing springs force, and for the remainder of the revolution less spring force being required to overcome friction between the sprocket and the hub and to build up energy to subsequently impact said driver.

* * * * *